United States Patent [19]

Markandey et al.

[11] Patent Number: 5,500,904
[45] Date of Patent: Mar. 19, 1996

[54] SYSTEM AND METHOD FOR INDICATING A CHANGE BETWEEN IMAGES

[75] Inventors: Vishal Markandey, Dallas; Anthony Reid, Plano, both of Tex.

[73] Assignee: Texas Instruments Incorporated, Dallas, Tex.

[21] Appl. No.: 873,932

[22] Filed: Apr. 22, 1992

[51] Int. Cl.$^6$ .................................................. G06K 9/00
[52] U.S. Cl. ........................ 382/103; 382/236; 382/254; 382/276
[58] Field of Search .................................. 382/56, 16, 30, 382/1, 41, 49, 54; 358/105, 135, 136; 348/155, 402, 113, 116, 154, 413, 416, 620; 364/423, 516, 517

[56] References Cited

U.S. PATENT DOCUMENTS

| | | | |
|---|---|---|---|
| 4,924,310 | 5/1990 | von Brant | 358/105 |
| 5,023,809 | 6/1991 | Spackman et al. | 358/105 |
| 5,032,905 | 7/1991 | Koga | 358/105 |
| 5,034,986 | 7/1991 | Karmann et al. | 382/1 |
| 5,067,014 | 11/1991 | Bergen et al. | 364/516 |
| 5,241,608 | 8/1993 | Fogel | 358/105 |
| 5,257,209 | 10/1993 | Markandey | 382/1 |

OTHER PUBLICATIONS

N. Cornelius and T. Kanade: "Adapting Optical–Flow to Measure Object Motion in Reflectance and X–Ray Image Sequences", Motion: Representation and Perception, edited by N. I. Badler and J. K. Tsotsos, Elsevier Science Publishing Co., 1986.

M. A. Gennert and S. Negahdaripour: "Relaxing the Brightness Constancy Assumption in Computing Optical Flow", Massachusetts Institute of Technology, Artificial Intelligence Laboratory, A.I. Memo No. 975, Jun. 1987.

F. Girosi, A. Verri and V. Torre: "Constraints for the Computation of Optical Flow", Proc. Workshop on Visual Motion, IEEE, 1989.

B. K. P. Horn. Robot Vision, Chapter 12: Motion Field & Optical Flow, The MIT Press, 1986.

B. K. P. Horn and B. G. Schunck: "Determining Optical Flow", Artificial Intelligence, vol. 17, edited by J. M. Brady, North–Holland Pub., 1981.

J. Little and A. Verri: "Analysis of Differential and Matching Methods for Optical Flow", Proc. Workshop on Visual Motion, IEEE, 1989.

V. Markandey et al.: "Image Analysis for Moving Target Indication Applications", Texas Instruments Technical Journal, Sep.–Oct., 1991.

(List continued on next page.)

Primary Examiner—Leo H. Boudreau
Assistant Examiner—Phuoc Tran
Attorney, Agent, or Firm—Tammy L. Williams; Leo N. Heiting; Richard L. Donaldson

[57] ABSTRACT

A method and system are provided for indicating a change between a first image and a second image. In a first aspect, a sequence of images is sensed (304, 310) including the first and second image. The first image is previous in the sequence to the second image. Each image previous in the sequence to the second image is processed generating a first processed image (312). The first processed image and the second image are then processed generating a second processed image (316, 312). The first processed image and the second processed image are then processed generating an optical flow field (314). The optical flow field shows the change between the first image and the second image. In a second aspect, a first sequence of images including the first image is sensed (206). A second sequence of images including the second image is sensed (206). The first sequence is processed generating a first processed image (210). The second sequence is also processed generating a second processed image (208). The first processed image and the second processed image are then processed generating an optical flow field (216). This optical flow field also indicates the change between the first image and the second image.

36 Claims, 10 Drawing Sheets

OTHER PUBLICATIONS

A. F. Milton: "Charge Transfer Devices for Infrared Imaging", *Optical and Infrared Detectors*, edited by R. J. Keyes, Springer–Verlag, 1980.

A. Mitiche, Y. F. Wang, and J. K. Aggarwal: "Experiments in Computing Optical Flow with the Gradient–Based, Multiconstraint Method", *Pattern Recognition*, vol. 20, No. 2, 1987.

P. Russo et al.: "Optical Flow Techniques for Moving Target Detection", *SPIE* vol. 1383 *Sensor Fusion* III: 3–D Perception and Recognition, 1990.

B. G. Schunck, Chapter 2: *Image Flow: Fundamentals and Algorithms, Motion Understanding–Robot and Human Vision*, edited by W. N. Martin and J. K. Aggarwal, Kluwer Academic Publishers, 1988.

V. Torre and T. Poggio: "On Edge Detection", *IEEE Trans. Patt. Anal. Mach. Intell., PAMI* –8(2), IEEE, 1986.

O. Tretiak and L. Pastor: "Velocity Estimation from Image Sequences with Second Order Differential Operators", *Proc. International Conference on Pattern Recognition*, IEEE, 1984.

K. Wohn, L. S. Davis and P. Thrift: "Motion Estimation Based on Multiple Local Constraints and Nonlinear Smoothing", *Pattern Recognition*, vol. 16, No. 6, 1983.

W. L. Wolfe and G. J. Zissis (editors): The Infrared Handbook, pp. 12–22 to 12–29, Environmental Research Institute of Michigan for the Office of Naval Research, Dept. of the Navy, Washington, D.C., 1978

Burt et al., "Object Tracking With a Moving Camera an Application of Dynamic Motion Analysis," 1989 IEEE.

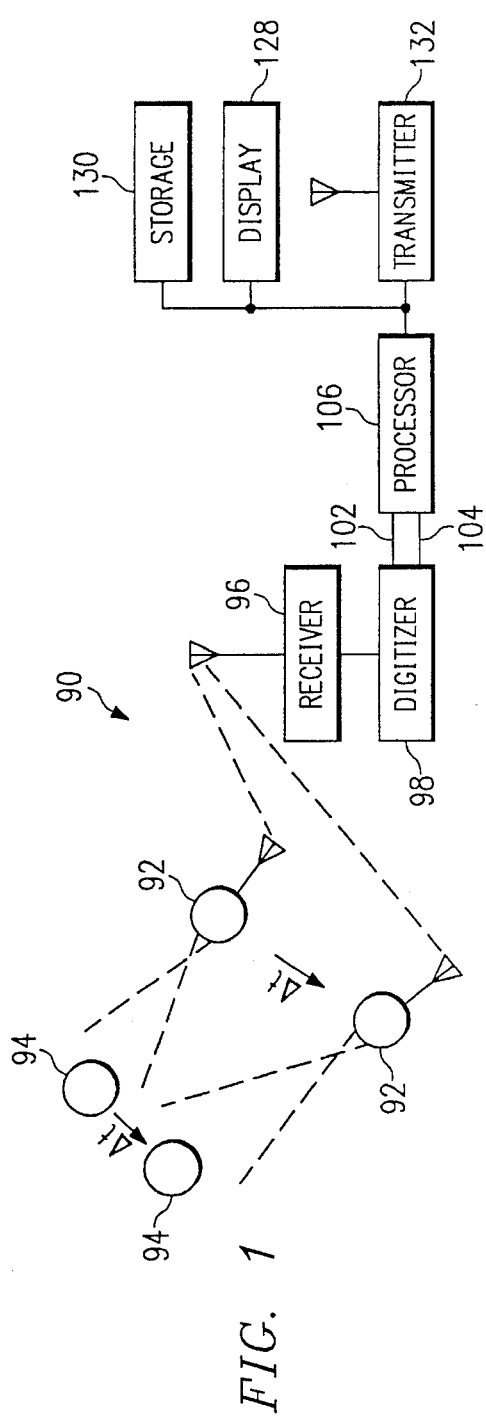
FIG. 1
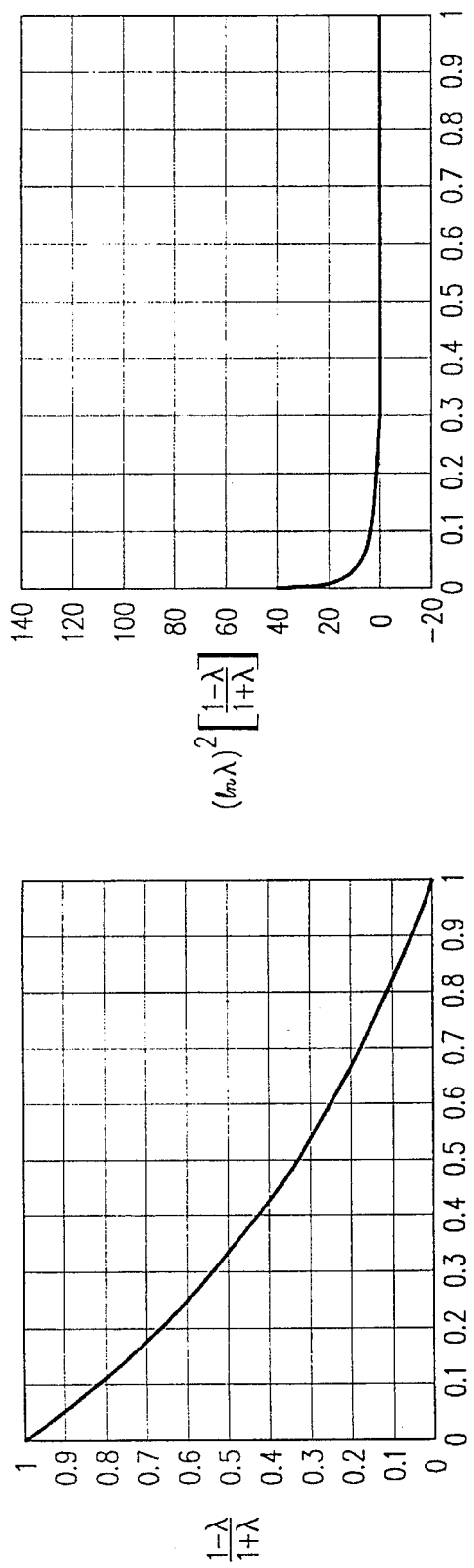
FIG. 4a
FIG. 4b

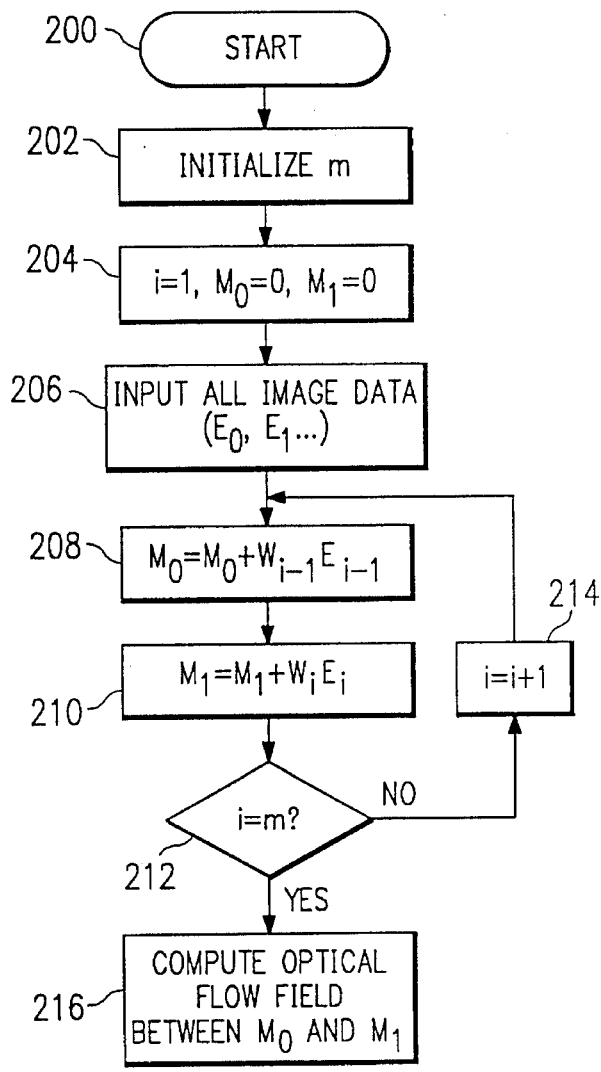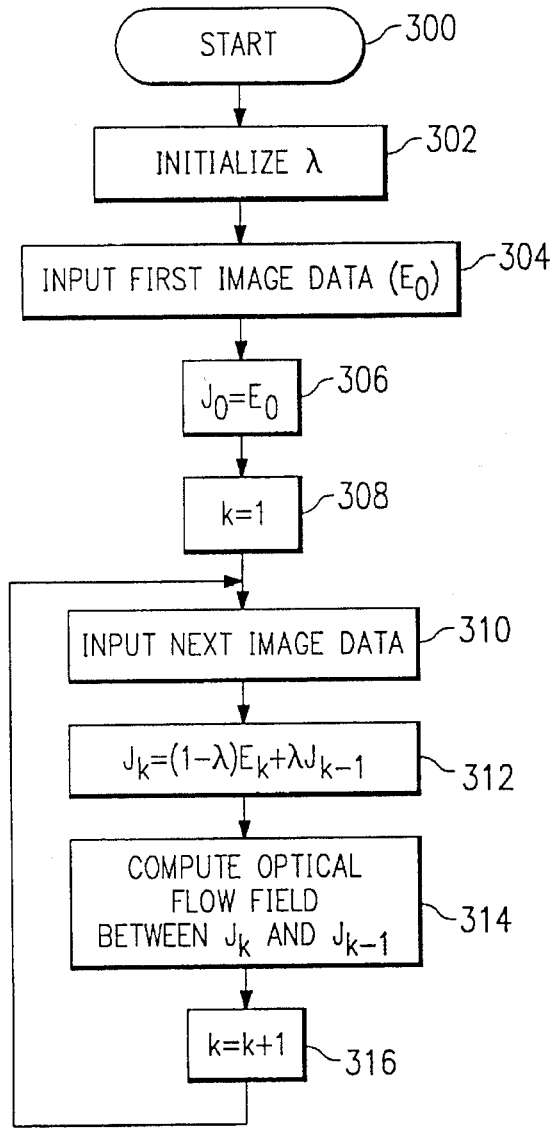
FIG. 2
FIG. 3

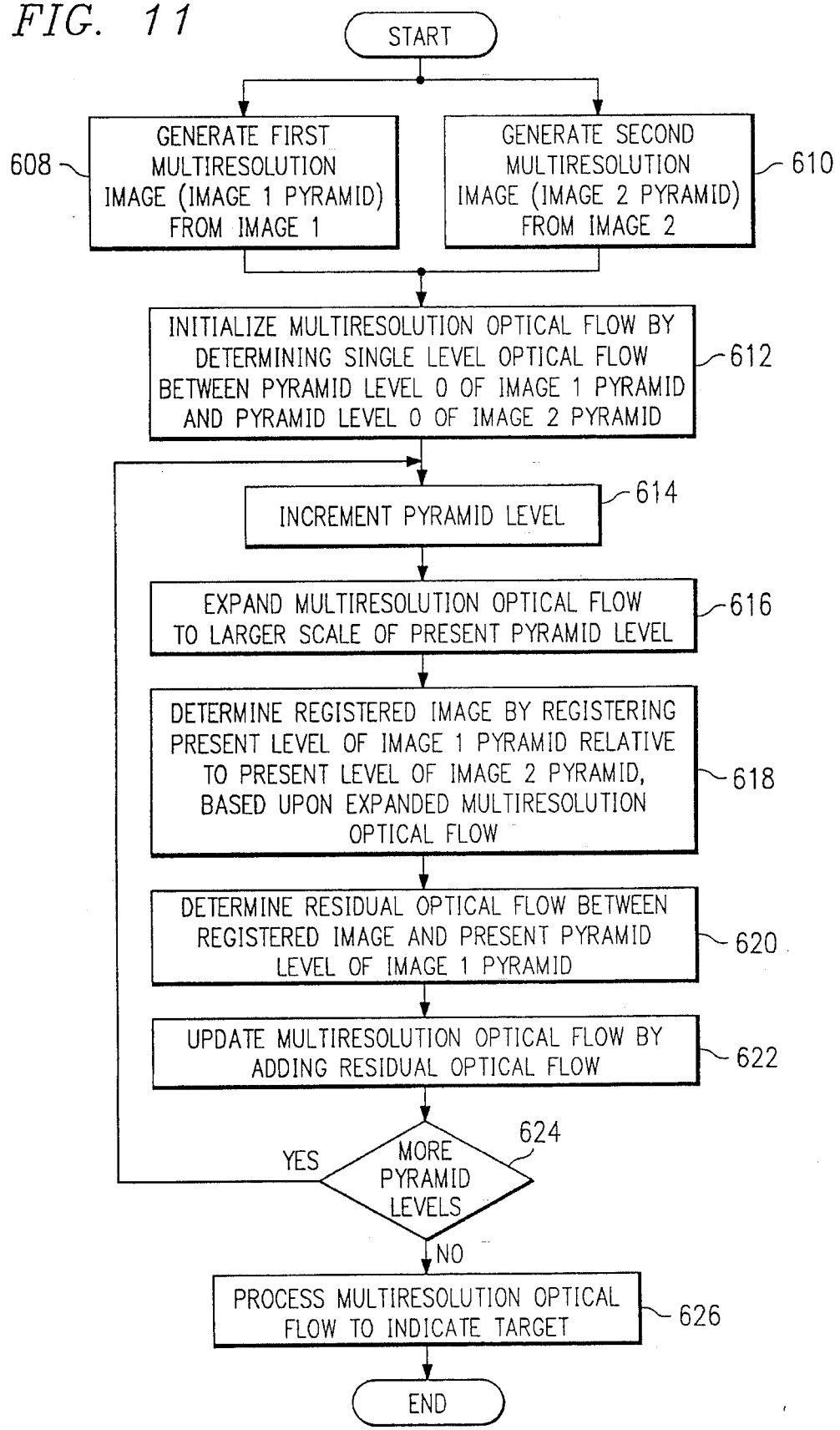

SYSTEM AND METHOD FOR INDICATING A CHANGE BETWEEN IMAGES

RELATED APPLICATIONS

This patent application is related to copending U.S. patent application Ser. No. 07/816,426, entitled "System and Method For Determining Optical Flow", by V. Markandey, filed Dec. 23, 1991.

TECHNICAL FIELD OF THE INVENTION

This invention relates in general to image processing and in particular to a method and system indicating a change between images.

BACKGROUND OF THE INVENTION

Moving target indication ("MTI") techniques can automatically detect motion of a moving target, based upon a sequence of images acquired by a sensor. In military applications, MTI techniques are used to detect motion of a target moving either along the ground or through the air; the images may be acquired by either a ground or air based sensor. Using imagery from electro-optical sensors such as infrared or TV cameras, the first step in MTI is the measurement of motion in image sequences. The measurement of motion between two images is represented by a two dimensional vector field in the image plane, each vector representing the motion at a specific pixel location. Such a vector field is known as an "optical flow field" and any single vector in the field is known as an "optical flow vector". Accordingly, the optical flow field includes an optical flow vector (u,v) for each pixel. The optical flow vector (u,v) for a pixel of a first image indicates the pixel's direction of movement relative to a second image during the $\Delta t$ time period between the first and second images.

The accuracy of an MTI technique can be improved by improving the accuracy of the optical flow field determined between successive images acquired by the sensor. By accurately determining such an optical flow field, target movement between the successive images can be accurately determined. The computation and use of optical flow is an active research topic in the field of computer vision/digital image processing. Nevertheless, previous techniques typically fail to address realistic situations where computation of optical flow uses noisy imagery. Typical previous optical flow computation techniques are based upon fairly idealized assumptions. Such techniques are noise sensitive and frequently impractical in real applications.

For example, differential techniques for computing dense optical flow fields are based on certain assumptions about the spatio-temporal variations of image intensity. The most common assumption (known as the intensity constancy assumption) is that the total temporal derivative of the image intensity is zero. Accordingly, the intensity constancy assumption requires that the image intensity corresponding to a physical surface patch remain unchanged over time.

Despite its widespread use, intensity constancy is not a realistic assumption in most practical situations. The intensity constancy assumption is not satisfied when parts of a surface are obscured or revealed in successive image frames, or when the surface or illumination source moves so that illumination is incident on the surface from different angles in successive frames. Such situations cause the surface shading to vary, thereby violating the intensity constancy assumption.

Even if the radiation received as sensor input satisfies the intensity constancy assumption, the sensor output of image intensity is corrupted by sensor noise. Random temporal variation of this noise component results in random fluctuations in image intensity values over time. Intensity constancy is an unrealistic assumption for optical flow computation where such noise contributions are a significant part of the measured image intensity values. This issue is important in practical situations, particularly in several defense applications, where the expendable nature of the sensor precludes the use of expensive sensors with negligible noise effects.

Previous techniques typically fail to address situations where the intensity constancy assumption is not satisfied. Some previous techniques use variations of the intensity constancy assumption that account for gradual changes in image intensity over time, corresponding to changes in surface shading. Other previous techniques regularize image data by convolving it with a smoothing function such as a Gaussian before estimating spatio-temporal derivatives that are required for computing optical flow. Such a smoothing function somewhat attenuates the effects of sensor noise, but noise reduction is ad hoc, and computed optical flow fields still tend to be noise sensitive.

It would be advantageous to reduce the effect of sensor noise on image data prior to optical flow computation, thereby decreasing the sensitivity of optical flow fields to sensor noise and hence improving their utility in realistic situations. Such a technique would be particularly suited to motion estimation and moving target indication from a stationary sensor, or one that may have electronic or mechanical drift.

Thus, a need has arisen for a method and system for indicating a change between images, in which accuracy of optical flow computations is less sensitive to noise in image data. Also, a need has arisen for a method and system for indicating a change between images, in which target movement between successive images is accurately determined. Further, a need has arisen for a method and system for indicating a change between images, in which effects of sensor noise on image intensity values are reduced prior to optical flow computations. Moreover, a need has arisen for a method and system for indicating a change between images, in which increased accuracy of optical flow computations is not ad hoc.

SUMMARY OF THE INVENTION

In a first aspect of a method and system for indicating a change between first and second images, a sequence of images is sensed. The sequence includes the first and second images. The first image is previous in the sequence to the second image. Each image previous in the sequence to the second image is processed, and a first processed image is generated in response thereto. The first processed image and the second image are processed, and a second processed image is generated in response thereto. The first and second processed images are processed, and an optical flow field is generated in response thereto. The optical flow field indicates the change between the first and second images.

In a second aspect of a method and system for indicating a change between first and second images, a first sequence of images including the first image is sensed. A second sequence of images including the second image is sensed. The first sequence is processed, and a first processed image is generated in response thereto. The second sequence is processed, and a second processed image is generated in response thereto. The first and second processed images are processed, and an optical flow field is generated in response thereto. The optical flow field indicates the change between the first and second images.

It is a technical advantage of the present invention that accuracy of optical flow computations is less sensitive to noise in image data.

It is another technical advantage of the present invention that target movement between successive images is accurately determined.

It is yet another technical advantage of the present invention that effects of sensor noise on image intensity values are reduced prior to optical flow computations.

It is a further technical advantage of the present invention that increased accuracy of optical flow computations is not ad hoc.

In another technical advantage of the present invention, accuracy of optical flow computations is less sensitive to variations of image intensity.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a block diagram of an MTI system applying the technique of the preferred embodiment;

FIG. 2 is a flow chart of a first exemplary technique of the preferred embodiment;

FIG. 3 is a flow chart of a second exemplary technique of the preferred embodiment;

FIGS. 4a–b are plots of functions of a weighting parameter of the second exemplary technique of the preferred embodiment;

FIG. 5b shows optical flow vectors from processing the image of FIG. 5a;

FIG. 6b shows optical flow vectors from processing the image of FIG. 6a;

FIG. 8b shows optical flow vectors from processing the image of FIG. 8a;

FIG. 9b shows optical flow vectors from processing the image of FIG. 9a;

FIG. 11 is a flow chart of a multiresolution optical flow determination technique, according to the preferred embodiment.

DETAILED DESCRIPTION OF THE INVENTION

Figure 5A:
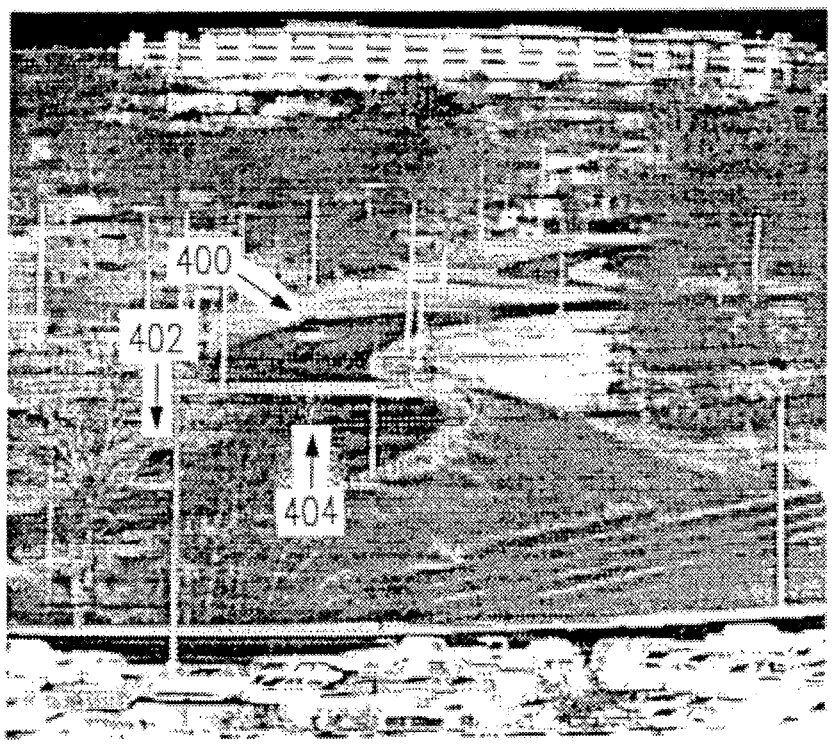
FIG. 5a is an image of first and second targets after processing according to a previous technique.

The preferred embodiment of the present invention and its advantages are best understood by referring to FIGS. 1–12 of the drawings, like numerals being used for like and corresponding parts of the various drawings.

FIG. 1 is a block diagram of an MTI system, indicated generally at 90, applying the technique of the preferred embodiment. A moving sensor 92 tracks a moving target 94 and transmits radio signals representing the sensed target images to a receiver 96. For a first image sensed by sensor 92 at a first moment, digitizer 98 inputs the received radio signals from receiver 96 and outputs a digitized first image data set 102 ("Image 1"). For a second image sensed by sensor 92 at a second moment Δt time after the first moment, digitizer 98 inputs the received radio signals from receiver 96 and outputs a digitized second image data set 104 ("Image 2"). A processor 106 inputs Image 1 and Image 2, processes them to reduce the effects of noise, determines an optical flow field, and computes a region of the images in which the target is located.

Processor 106 outputs the optical flow field and the region in which the target is located, which are then stored by storage 130. Display 128 indicates the region in which the target is located. Based on the optical flow field and the computed region in which the target is located, transmitter 132 transmits tracking control signals to sensor 92. Transmitter 132 further transmits information signals to a central controller (not shown), which can enable or disable multiple sensors in a coordinated fashion, based upon the optical flow field and the computed region in which the target is located.

The accuracy of an MTI technique can be improved by improving the accuracy of an optical flow field determined between successive images acquired by a sensor. By accurately determining such an optical flow field, target movement between the successive images can be accurately determined. The development of techniques for optical flow computation that are less sensitive to noise can be addressed by two different approaches.

Under a first approach, noise terms can be incorporated into the constancy assumptions that form the basis of optical flow computation techniques, and new techniques are developed for minimizing the contributions of these noise terms in the optical flow being computed. Under a second approach, sensor noise contributions are minimized in data used by existing flow computation techniques, by preprocessing the data before it is used by these techniques.

Any of several optical flow determination techniques may be used to determine optical flow, with each pixel having an optical flow vector. For example, the optical flow determination can be based upon brightness, gradient constancy assumptions, and correlation or Fourier transform techniques. The optical flow field is further processed by a segmentation technique, such as motion energy calculation, discontinuity edge detection or histogram segmentation. These segmentation techniques isolate regions corresponding to moving targets. The moving target can be identified by centroid coordinates and a confidence measure.

Most current optical flow computation techniques are based on fairly idealized assumptions and consequently their outputs are noise sensitive and frequently unusable in real applications. For example, differential techniques for computing dense optical flow fields are based on certain assumptions about the spatio-temporal variations of image intensity. The most common assumption is that the total temporal derivative of the image intensity is zero, i.e., if $E(x,y,t)$ is the intensity at pixel $(x,y)$ at time $t$ then:

$$dE/dt=0 \quad (1)$$

This equation can be expanded to:

$$E_x u + E_y v + E_t = 0 \quad (2)$$

where $E_x, E_y, E_t$ are partial derivatives of E with respect to x,y,t. Also, u,v are the optical flow components in the x and y directions respectively. Several optical flow computation techniques have attempted to solve Equation (2) for (u,v). Since this equation provides only one constraint for the two unknowns (u,v), these techniques have used various means to obtain another constraint to solve for the unknowns. Techniques have been developed that use spatial smoothness of the flow field, least squares fitting of pixel neighborhood information, constraint clustering in spatial neighborhoods, and multiple constraints based on constancy assumptions applied to image functions such as spatial gradient magnitude, curvature, and moments, or image contrast, entropy, neighborhood gray scale averages, variances, medians, and the power contents of images in various frequency regions. One previous technique uses partial derivatives of Equation (2) with respect to x and y and assumes that spatial derivatives of u and v are zero in order to obtain the equations $$E_{xx}u + E_{xy}v + E_{xt} = 0 \quad (3)$$

$$E_{xy}u + E_{yy}v + E_{yt} = 0 \quad (4)$$

where $E_{xx}, \ldots, E_{yt}$ represent second order spatio-temporal derivatives of the image intensity function $E(x,y,t)$. These equations can be solved for (u,v) at pixels where $E_{xx}E_{yy} - E_{xy}^2 \neq 0$. These same equations can be derived by considering constancy of the spatial image gradient.

In the preferred embodiment, processor 106 combines multiple data observations acquired at different points in time, the signal to noise ratio of image data can be improved. It has been previously known that the concept of "Time Delay and Integration (TDI)" may be used in the design of Charged Coupled Device (CCD) based imagers to improve image quality by minimizing sensor noise effects. CCD's for detection of visible or infrared radiation use a number of detectors combined in various configurations. In one such previously developed configuration called "serial scanning", a linear array of detectors is raster scanned across the scene being imaged. The output of each detector is provided to a delay element and the outputs of all detectors are combined. The delay elements are clocked at a rate corresponding to the image velocity across the detector array. The noise contributions of the detectors are independent and thus uncorrelated, so the variance of the noise component in the summed output is a mean square summation of the individual noise variances. On the other hand, the signal components are added linearly. Thus, for n detectors, a signal to noise improvement of $\sqrt{n}$ is obtained over the output of any single detector. Another configuration called "serial-parallel scanning" uses essentially the same operation except that raster scanning is replaced by a two-dimensional array of detectors.

In the preferred embodiment, the processor 106 is programmed to extend the TDI concept to multiple image integration for interframe noise reduction. For a set of m images of the same scene acquired at different points in time, the m gray scale values at any pixel location are time delayed measurements of the same signal with independent noise components in each case. Thus, processor 106 combines these measurements together to achieve a signal to noise improvement of $\sqrt{m}$ over any single image. This is strictly true only for regions in the image where there is no motion. To account for the fact that there may be motion in parts of the image, processor 106 is programmed to implement an integration scheme that assigns weights to the m gray scale values such that the contribution of any given image to the integrated image decreases with time. An exponential decay function can be used for this purpose, according to the following integration scheme $$M_o = w_o E_o + w_1 E_1 + \ldots + w_{m-1} E_{m-1} \quad (5a)$$

$$M_1 = w_1 E_1 + w_2 E_2 + \ldots + w_m E_m \quad (5b)$$

where for Equation (5a), $$w_i = k_1 e^{-i/k_2} \quad (6a)$$

and where for Equation (5b), $$w_i = k_1 e^{-(i-1)/k_2} \quad (6b)$$

$M_o$ is the integrated image, $E_o$ is the latest image acquired by the sensor, $E_m$ is the earliest image, $k_1$ is a scale factor, and $k_2$ controls the decay rate of the exponential. The sum of the weights is held at 1 to maintain image data within a specific number of bits (8 bits for 256 gray level imagery).

FIG. 2 is a flow chart of such a first exemplary technique of the preferred embodiment. Execution begins at step 200. At step 202, the number of m images is initialized. At step 204, an index i is initialized to a value of 1, and $M_0$ and $M_1$ are each initialized to values of 0. At step 206, all image data $E_o$ through $E_m$ is input. Step 208 updates $M_0$ by adding $w_{i-1}E_{i-1}$ according to Equation (5a). Step 210 updates $M_1$ by adding $w_i E_i$ according to Equation (5b). Decision block 212 determines whether index i is equal to m. If index i is not equal to m, then step 214 increments index i, and execution returns to step 208. If index i is equal to m, then execution continues to step 216 which computes an optical flow field between $M_0$ and $M_1$. Accordingly, $M_0$ corresponds to image data $E_o$ after processing according to Equation (5a), and $M_1$ corresponds to image data $E_1$ after processing according to Equation (5b). As discussed further hereinbelow, such an optical flow field computed between $M_0$ and $M_1$ has been shown to be more accurate than an optical flow field computed between unprocessed "raw" image data $E_o$ and $E_1$.

A disadvantage of the "Batch Processing" scheme for image integration represented by Equations (5a), (5b), (6a) and (6b) is that it requires simultaneous storage of multiple images, because $M_0$ cannot be computed simply on the basis of $E_0$ and the computed value of $M_1$. A total of m+1 images is required to generate $M_0$ and $M_1$ for optical flow computation. This can be overcome by programming processor 106 to implement an iterative "Recursive Processing" scheme $$J_o = E_o \quad (7)$$

$$J_k = (1-\lambda)E_k + \lambda J_{k-1} \quad (8)$$

where $0 < \lambda < 1$ to ensure the image contributions decay with time. The processed images $J_{k-1}$ and $J_k$ are then used for optical flow computation in place of the raw images $E_{k-1}$ and $E_k$.

FIG. 3 is a flow chart of such a second exemplary technique of the preferred embodiment. Execution beings at step 300. At step 302, the value of $\lambda$ is initialized. At step 304, image data $E_o$ for a first image is input. Step 306 executes Equation (7), and step 308 initializes an index k to a value of 1. Step 310 inputs image data $E_k$ for a next image. Step 312 then executes Equation (8). Step 314 computes an optical flow field between $J_k$ and $J_{k-1}$. Then, Step 316 increments index k, and execution returns to step 310.

Unlike the technique of FIG. 2, the technique of FIG. 3 does not require predetermination of a maximum number of m images. In a further advantage of the technique of FIG. 3, $J_k$ can be computed on the basis of $J_{k-1}$ and $E_k$, so that simultaneous storage of multiple images is not required. This advantage is particularly useful in systems having a small amount of data storage capacity.

Bounds on the value of the parameter $\lambda$ in Equation (8) can be determined according to a noise characterization of the temporal image integration method. Taking z-transforms of both sides of Equation (8) results in $$J(z)=(1-\lambda)E(z)+\lambda z^{-1}J(z) \tag{9}$$

which gives the transfer function of the operation in Equation (8)

$$H(z) = \frac{J(z)}{E(z)} = \frac{1-\lambda}{1-\lambda z^{-1}} \tag{10}$$

Taking the inverse z-transform results in $$h(k)=(1-\lambda)\lambda^k (k \geq 0) \tag{11}$$

The effect of noise on optical flow depends on the specific technique used to compute the flow. The preferred embodiment uses a spatio-temporal filtering technique described further hereinbelow. Under the spatio-temporal filtering technique, two linear equations are solved for the optical flow components (u,v) at the pixel level. The coefficients in the equations are spatio-temporal derivatives of image intensity. These derivatives are computed by convolving the image data with a set of filters that are derivatives of a Gaussian. Assuming that interframe noise is white and additive, with zero mean and variance $\sigma_N^2$, the noise variances of the various derivative terms can be estimated. E(x,y,t) is the image intensity measured at pixel (x,y) at time t. This measurement consists of the true intensity $\tilde{E}(x,y,t)$ corrupted by white, additive noise n(x,y,t). If noise is zero mean, then $$E(x,y,t)=\tilde{E}(x,y,t)+n(x,y,t) \tag{12}$$

The spatial derivatives for the temporally integrated image are given by $$E_{ij}=E(x,y,t)*G_{ij}(x,y)*h(t)=[\tilde{E}(x,y,t)+n(x,y,t)]*G_{ij}(x,y)*h(t) \tag{13}$$

where i=x or y, j=x or y. $G_{ij}(x,y)$ represents second order spatial derivatives of the spatial Gaussian with normalization A $$G(x,y) = A\, e^{-\frac{x^2+y^2}{2\sigma^2}} \tag{14}$$

and h(t) is the analog equivalent of Equation (11).

Accordingly, the variance of the derivative is $$\sigma_{E_{ij}}^2 = \overline{[n(x,y,t)*G_{ij}(x,y)*h(t)]^2} \tag{15}$$

i.e.

$$\sigma_{E_{ij}}^2 = \sigma_N^2 \int_{-\infty}^{\infty}\int_{-\infty}^{\infty} G_{ij}^2(x-\alpha, y-\beta)\, d\alpha d\beta \int_{-\infty}^{t} h^2(t-\gamma) d\gamma \tag{16}$$

Actual spatial and temporal indices are discrete in order to reflect the digital nature of the image and the fact that separate images in time are being integrated. The following notation for sampling in the temporal domain is used to formulate a discretized version of the above equation. This could also be extended to sampling in the spatial domain. Spatial terms as represented in the above equation can be used without affecting the remaining analysis.

$$f(n)\equiv f(n\Delta t)\equiv\delta(t-n\Delta t)\, f(t)\equiv f(t)|_{t=n\Delta t} \tag{17}$$

With a change of variable, Equation (16) can be rewritten as $$\sigma_{E_{ij}}^2 = \sigma_N^2 \int_{-\infty}^{\infty}\int_{-\infty}^{\infty} G_{ij}^2(x-\alpha, y-\beta)\, d\alpha d\beta \int_{0}^{\infty} h^2(\tau) d\tau \tag{18}$$

Using the notation of Equation (17), $$\sigma_{E_{ij}}^2 = \sigma_N^2 \int_{-\infty}^{\infty}\int_{-\infty}^{\infty} G_{ij}^2(x-\alpha, y-\beta)\, d\alpha d\beta \sum_{k=0}^{\infty} h^2(k) \tag{19}$$

is used to define the discretized version of Equation (18) as $$h(k)\equiv h(k\Delta\tau)\equiv h(\tau)|_{\tau=k\Delta\tau} \tag{20}$$

Similarly, concerning the spatio-temporal derivatives for the temporally integrated image $$E_{kt}=E(x,y,t)*G_k(x,y,t)*h_t(t)=[\tilde{E}(x,y,t)+n(x,y,t)]*G_k(x,y)*h_t(t) \tag{21}$$

where k=x or y. Accordingly, the variance of the spatio-temporal derivative is $$\sigma_{E_{kt}}^2 = \overline{[n(x,y,t)*G_k(x,y)*h_t(t)]^2} \tag{23}$$

As in the case of the variance for the spatial derivatives, $$\sigma_{E_{kt}}^2 = \sigma_N^2 \int_{-\infty}^{\infty}\int_{-\infty}^{\infty} G_k^2(x-\alpha, y-\beta)\, d\alpha d\beta \sum_{k=0}^{\infty} h_t^2(k) \tag{24}$$

The effect of temporal integration on the variance terms represented by Equation (20) and Equation (23) may be considered separately. In Equation (20), the temporal integration term should be less than 1, for the variance of the derivatives after temporal integration to be less than that without temporal integration, i.e.

$$\sum_{k=0}^{\infty} h^2(k) < 1 \tag{25}$$

If Equation (11) is substituted into the left hand side of Equation (24) and simplified, then $$\sum_{k=0}^{\infty} h^2(k) = \frac{1-\lambda}{1+\lambda} \tag{26}$$

provided that $$\lambda^2 < 1 \tag{27}$$

The condition specified in Equation (24) is then $$\frac{1-\lambda}{1+\lambda} < 1 \tag{28}$$

To satisfy this condition, Equation (26) and the conditions hereinabove require that $$0 < \lambda < 1 \tag{29}$$

FIG. 4a is a plot of the right hand side of Equation (25) for this range of λ. It can be seen that the function value lies between 0 and 1 for this range of λ, thereby satisfying Equation (27). Accordingly, Equation (28) specifies the range of values for λ that reduces the variance of the spatio-temporal derivative terms.

When considering reduction of noise variance represented by Equation (23), the temporal integration term should be less than 1 to ensure that the variance of the derivatives after temporal integration is less than that without temporal integration, i.e.

$$\sum_{k=o}^{\infty} h_t^2(k) < 1 \tag{30}$$

To compute $h_t(k)$, the analog equivalent of $h(k)$ is considered $$h(t) = (1-\lambda)\lambda^t \tag{31}$$

Then, $$h_t(t) = (1-\lambda)(ln\lambda)\lambda^t \tag{32}$$

where $ln\lambda$ is the logarithm of λ to the natural base. Then, $$h_t^2(k) = (1-\lambda)^2 (ln\lambda)^2 \lambda^{2k} \tag{33}$$

If the right hand side of Equation (32) is substituted into Equation (29), then $$(1-\lambda)^2 (ln\lambda)^2 \sum_{k=o}^{\infty} \lambda^{2k} < 1 \tag{34}$$

After simplifying, $$(1-\lambda)^2 (ln\lambda)^2 \sum_{k=o}^{\infty} \lambda^{2k} = (ln\lambda)^2 \left[ \frac{1-\lambda}{1+\lambda} \right] \tag{35}$$

provided that $$\lambda^2 < 1 \tag{36}$$

Accordingly, Equation (33) becomes $$(ln\lambda)^2 \left[ \frac{1-\lambda}{1+\lambda} \right] < 1 \tag{37}$$

FIG. 4b is a plot of the left hand side of Equation (36). Where λ is less than or equal to 1, the range of λ values is numerically determined to be $$0.2681 < \lambda < 1 \tag{38}$$

This condition is tighter than the condition represented in Equation (28) and therefore is a suitable condition for use in conjunction with Equations (7) and (8) for temporal image integration.

The above analysis for the effect of temporal integration on spatial and spatio-temporal derivative variances assumes that the number of images being integrated is infinite. However, in practice the number of images integrated is always finite, hence the analysis is modified accordingly. If N is the number of images being integrated, then the conditions represented by Equations (24) and (29) are respectively modified to $$\sum_{k=o}^{N-1} h^2(k) < 1 \tag{39}$$

$$\sum_{k=o}^{N-1} h_t^2(k) < 1 \tag{40}$$

These equations can be simplified to $$\frac{1-\lambda}{1+\lambda} (1 - \lambda^{2N}) < 1 \tag{41}$$

and $$\frac{1-\lambda}{1+\lambda} (ln\lambda)^2 (1 - \lambda^{2N}) < 1 \tag{42}$$

provided that $$\lambda^2 < 1 \tag{43}$$

Equation (42) and the conditions above require that $$0 < \lambda < 1 \tag{44}$$

For this range of λ values and for N greater than 1, the condition represented by Equation (40) is always satisfied. By computing limits on the values of λ that satisfy Equation (41) for various values of N, it is found that for N=2

$$0.2675 < \lambda < 1 \tag{45}$$

and for N>2

$$0.2681 < \lambda < 1 \tag{46}$$

The bound specified in Equation (45) is the same as the bound for the case of infinite number of images in Equation (37). Also, the bound specified in Equation (45) is tighter than that for the case of N=2 specified in Equation (44). Thus, Equation (45) is practical for N≧2. Irrespective of the number of images integrated, the bounds specified by Equation (45) can be used for image integration to achieve reduction in the effect of noise on optical flow computation.

The technique of the preferred embodiment for temporal image integration was tested on real imagery using sequences of outdoor infrared (8–12 μm) images. Optical flow fields were subjected to post-processing operations including spatial median filtering and an iterative smoothing technique. This technique formulates flow field smoothing as a minimization problem with a cost function that is a weighted combination of two terms: (i) a cost for deviation of the final flow field values from the original unsmoothed flow field, and (ii) a cost for the lack of smoothness of the final flow field. The computed optical flow fields provide motion information that is then subjected to further processing to achieve moving target indication. Details of the technique discussed hereinbelow are suitable to moving target indication from a stationary sensor, or one with electronic or mechanical drift.

A series of processing steps, explained below, are used to achieve moving target indication from optical flow measurements, resulting in a ranked target list with associated statistics such as target centroids and detection scores in the form of confidence measures. Given an optical flow field, a measure of motion energy is first computed by considering a circular region centered at any pixel location and computing the sum of contributions from individual optical flow components in the region. Thus, for a given pixel location, the average motion energy computed from the circular region is $$e = \frac{\Sigma_i (u_i^2 + v_i^2)}{N} \tag{47}$$

where the summation is carried out over the circular region, the index i specifies individual pixel location in the region, and N is the total number of pixels in the region. The size of the circular region is selected based upon an estimate of the target size. A circular region is used because the direction of target motion is not predetermined. The target can have purely translational motion, can be moving toward/away, or can skew/swerve with respect to the sensor. Because the circular region has a nondirectional nature, it accounts for possible variability in directions of target motion.

The average motion energy e computed above is assigned as a score for the circular region. Regions are ranked according to their motion energy scores and the top ten locations are selected to create a moving target list, which forms the output of the moving target indication algorithm. The score values of the regions are used to associate confidence measures with the target list.

This technique is suited to detection of moving targets from stationary sensors or ones where the apparent background motion due to sensor drift is much smaller in magnitude than the target motion. A simple variation of this technique is used where the apparent background motion is comparable to or larger than target motion.

In a first experiment, the image sequence included 11 images labeled $E_0, \ldots, E_{10}$, with $E_o$ representing the latest image in the sequence and $E_{10}$ representing the earliest image. These images were acquired from a stationary sensor. FIG. 5a shows image $E_o$ after processing according to a previous spatial smoothing technique. The only significant motion in the field of view was that of two target vehicles, indicated generally at 400 and 402, on a road 404.

Figure 5B:
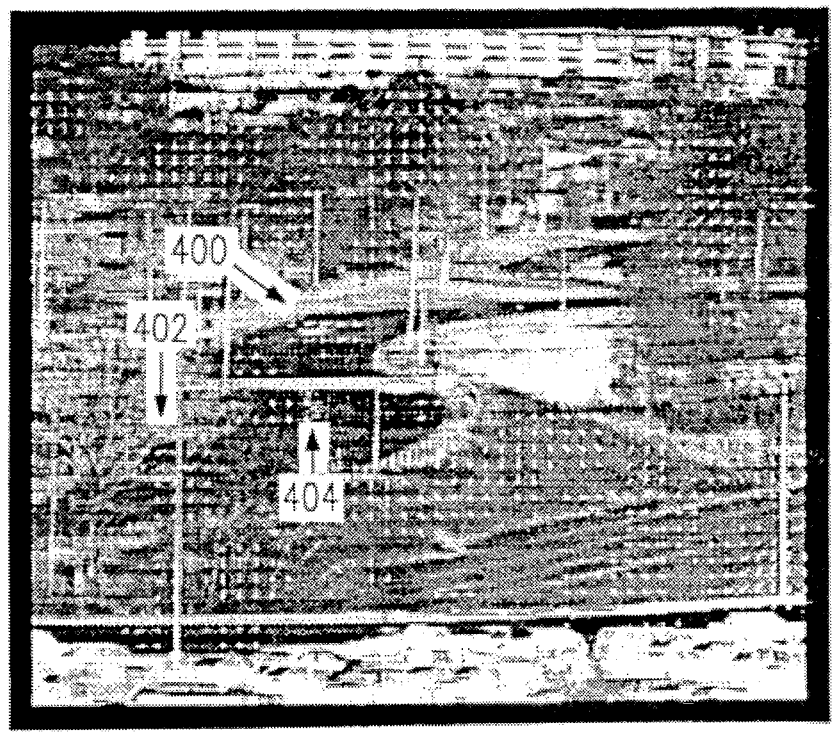

The optical flow field computed from images $E_0$ and $E_1$, without temporal integration, is shown superimposed on $E_0$ in FIG. 5b. FIG. 5b shows spurious flow vectors due to interframe noise, in regions where there is no significant motion. The following parameters were used in computing the optical flow field shown in FIG. 5b:

(1) standard deviation of the Gaussian filter for computing spatio-temporal derivatives, $\sigma=3.0$;

(2) size of median filter=3×3 pixels;

(3) number of median filter iterations=5;

(4) number of smoothing iterations=50; and (5) relative weight of smoothness to accuracy, k=16.

The optical flow field shown in FIG. 5b is called $O_1$.

Figure 6A:
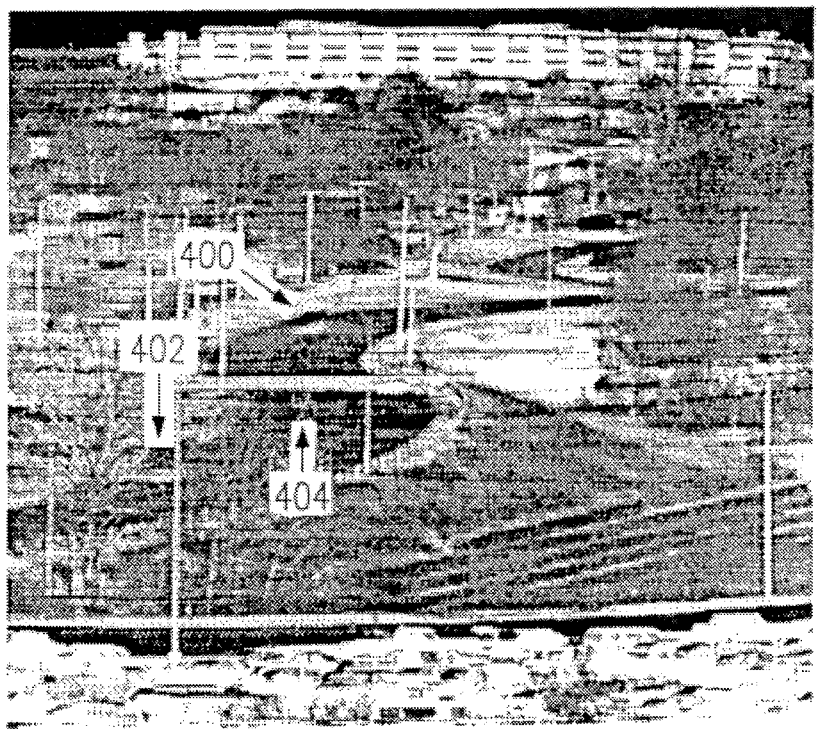
FIG. 6a is the image of FIG. 5a after processing according to the technique of the preferred embodiment.
Figure 6B:
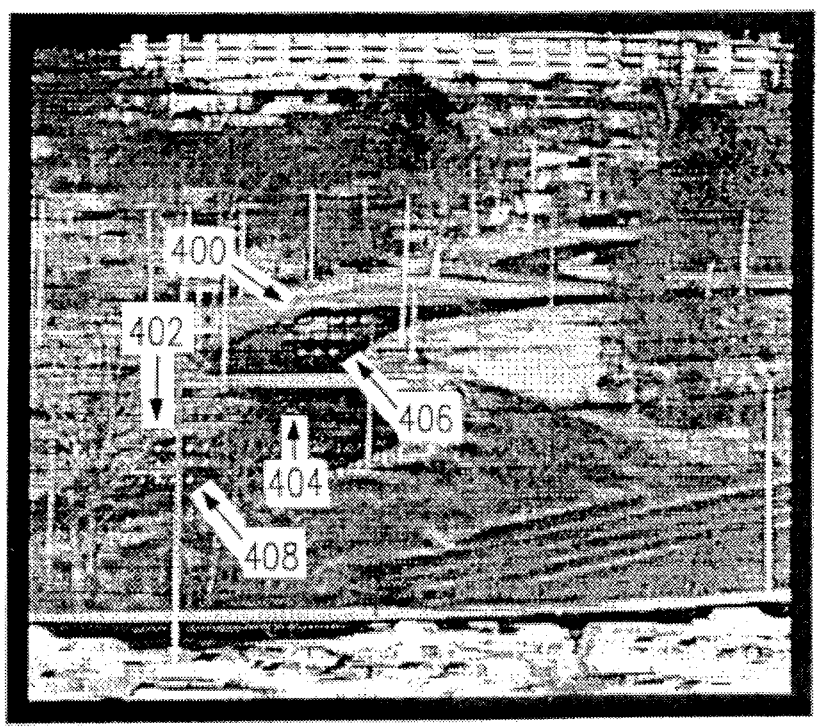

By comparison, images $E_0, \ldots, E_9$ were integrated using the technique of the preferred embodiment represented by Equations (7) and (8), with $\lambda=0.5$. The resulting image $J_0$ is shown in FIG. 6a. Images $E_1, \ldots, E_{10}$ were similarly integrated to obtain $J_1$. Optical flow was computed between $J_0$ and $J_1$ using the processing steps and parameter values that were used earlier to compute the flow field between $E_0$ and $E_1$. The resulting optical flow field is shown superimposed on $J_0$ in FIG. 6b. The optical flow field shown in FIG. 6b is called $O_2$. Comparison of FIG. 6b to FIG. 5b shows the improvement achieved by the technique of the preferred embodiment in reducing the effect of noise on the optical flow field, demonstrated by the concentration of optical flow vectors at regions 406 and 408 proximate to target vehicles 400 and 402, respectively. Flow vectors in both images are plotted at the same scale.

Figure 7A:
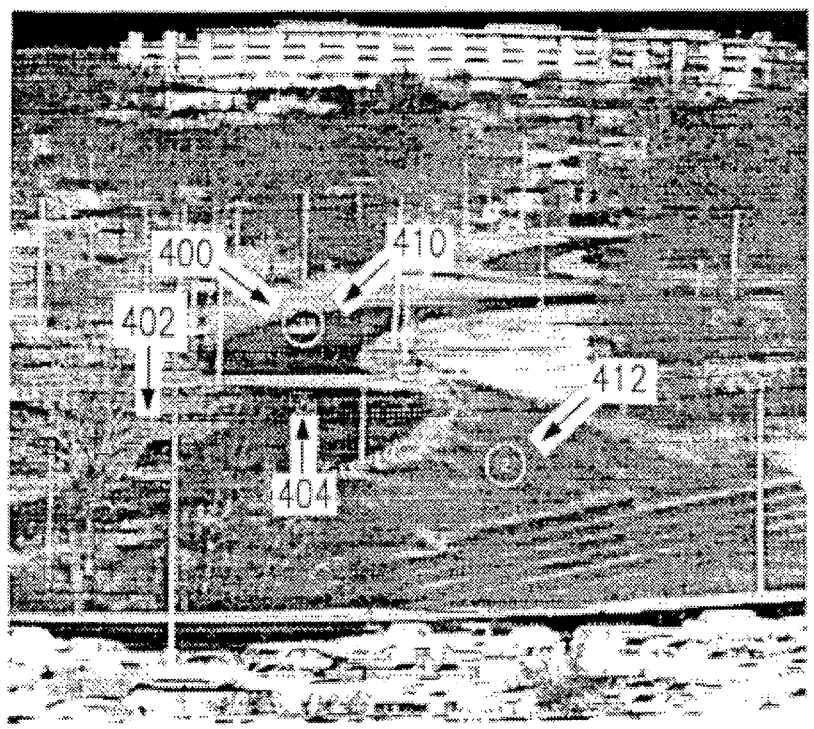
FIG. 7a shows boundaries around predicted targets in response to the optical flow vectors of FIG. 5b.
Figure 7B:
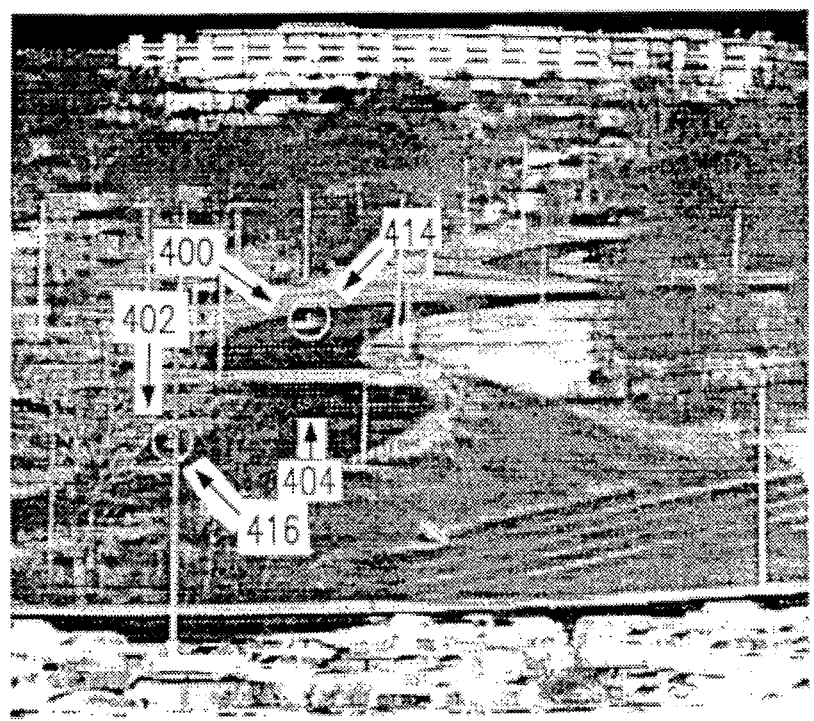
FIG. 7b shows boundaries around predicted targets in response to the optical flow vectors of FIG. 6b.

Optical flow fields $O_1$ and $O_2$ were processed using the moving target indication technique explained hereinabove. FIG. 7a shows circular boundaries 410 and 412 around predicted targets in response to the optical flow vectors of FIG. 5b. FIG. 7b shows circular boundaries 414 and 416 around predicted targets in response to the optical flow vectors of FIG. 6b. As can be seen, target vehicle 402 was not properly predicted in FIG. 7a using $O_1$, but both target vehicles 400 and 402 were properly predicted in FIG. 7b using $O_2$. Also, the detection score values are generally much higher for $O_2$ than for $O_1$, as shown in Table 1.

TABLE 1

Detection Results for Experiment 1

| Target Rank | Centroid - $O_1$ | Score - $O_1$ | Centroid - $O_2$ | Score - $O_2$ |
|---|---|---|---|---|
| 1 | (198,191)* | 1.69 | (197,194)* | 6.71 |
| 2 | (287,321) | 1.45 | (274,107)* | 2.79 |
| 3 | (352,471) | 1.44 | (14,59) | 2.34 |
| 4 | (277,100)* | 1.32 | (352,469) | 1.55 |
| 5 | (99,471) | 1.29 | (98,474) | 1.37 |
| 6 | (67,30) | 1.27 | (389,139) | 1.32 |
| 7 | (291,450) | 1.14 | (418,345) | 1.32 |
| 8 | (328,399) | 1.11 | (14,19) | 1.08 |
| 9 | (139,434) | 1.06 | (235,247) | 1.05 |
| 10 | (91,138) | 1.00 | (69,31) | 1.00 |

Although Table 1 lists centroid pixel coordinates for the top 10 predicted target regions having the highest detection score values, only the top two entries of the target list from Table 1 are displayed in FIGS. 7a and 7b. True centroid pixel coordinates of target vehicles 400 and 402 are marked with an asterisk (*) in Table 1. Note that target vehicle 402, which was not properly identified in FIG. 7a, is ranked only fourth in the listing of Table 1 under the headings for $O_1$.

Figure 8A:
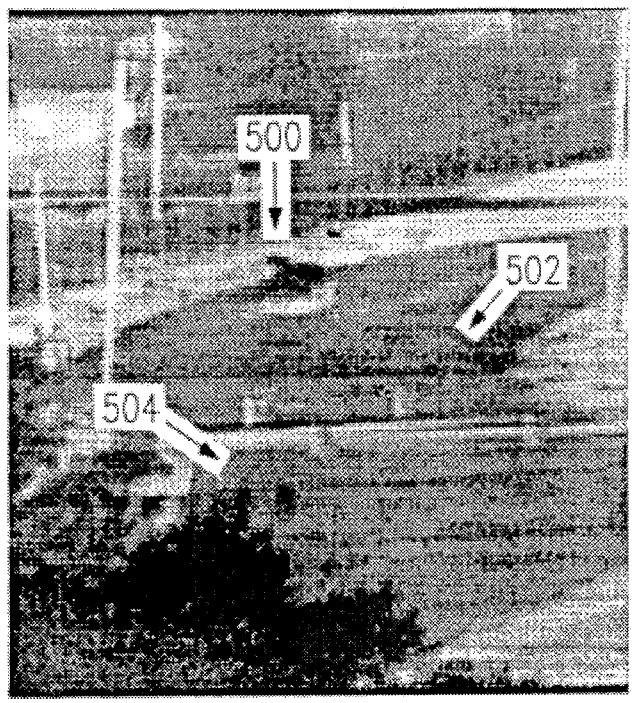
FIG. 8a is an image of first and second targets after processing according to a previous technique.

In a second experiment, the image sequence included 11 images labeled $E_0, \ldots, E_{10}$, with $E_0$ representing the latest image in the sequence and $E_{10}$ representing the earliest image. FIG. 8a shows image $E_o$ after processing according to a previous spatial smoothing technique. The sensor had translational drift perpendicular to the optical axis, resulting in apparent motion of the background in the image. The background motion is primarily left to right with a slight upward component. A car indicated generally at 500 in the scene is moving down a road 502, and a person indicated generally at 504 is walking near bushes in the foreground.

Figure 8B:
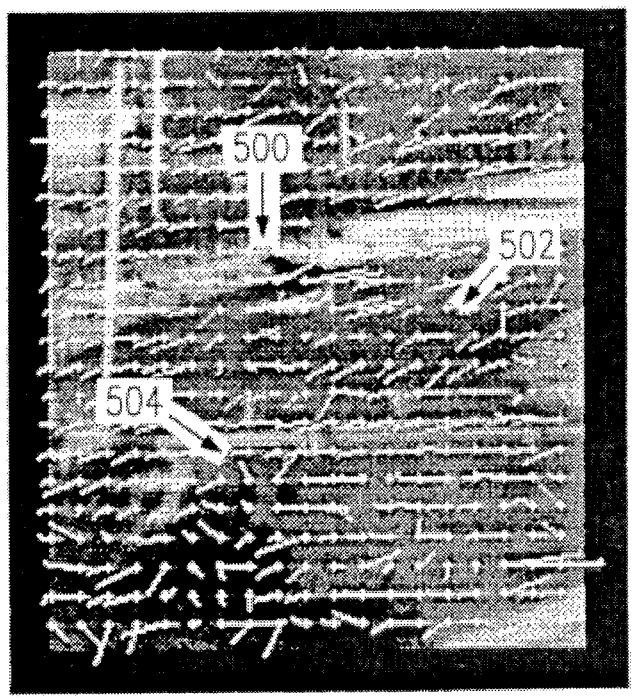

The optical flow field computed from images $E_0$ and $E_1$ without temporal integration is shown superimposed on $E_0$ in FIG. 8b. The parameters used for optical flow computation were the same as those used in Experiment 1 described hereinabove in connection with FIG. 5b. The optical flow field shown in FIG. 8b is called $P_1$.

Figure 9A:
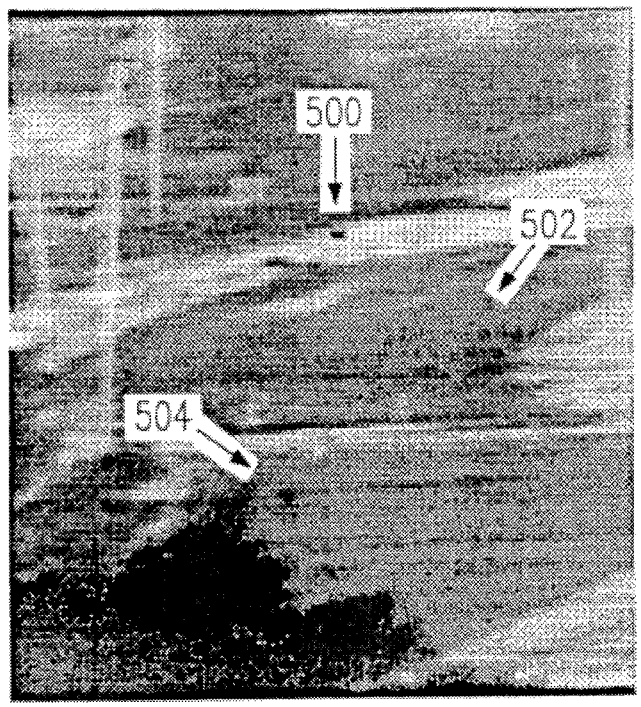
FIG. 9a is the image of FIG. 8a after processing according to the technique of the preferred embodiment.
Figure 9B:
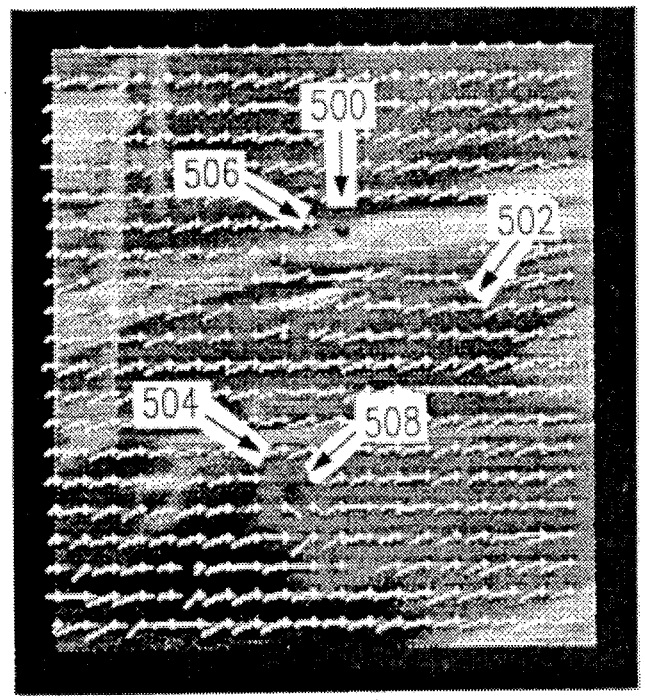

By comparison, images $E_0, \ldots, E_9$ were integrated using the technique of the preferred embodiment represented by Equations (7) and (8), with $\lambda=0.5$. The resulting image $J_0$ is shown in FIG. 9a. Images $E_1, \ldots, E_{10}$ were similarly integrated to obtain $J_1$. Optical flow was computed between $J_o$ and $J_1$ using the processing steps and parameter values that were used earlier to compute the flow field between $E_0$ and $E_1$. The resulting optical flow field is shown superimposed on $J_0$ in FIG. 9b. The optical flow field shown in FIG. 9b is called $P_2$. Comparison of FIG. 9b to FIG. 8b shows the improvement achieved by the technique of the preferred embodiment in reducing the effect of noise on the optical flow field, demonstrated by the significant perturbations of optical flow vectors at regions 506 and 508 proximate to car 500 and person 504, respectively. Comparatively, perturbations of optical flow vectors in FIG. 8b are more random, noisy, and less related to car 500 and person 504. Flow vectors in both images are plotted at the same scale.

Optical flow fields $P_1$ and $P_2$ were processed using a modification of the moving target indication technique explained hereinabove. The background is first roughly registered by computing a global estimate of the background motion from the optical flow field, and only the flow vectors not corresponding to the background motion are used for the moving target indication process explained hereinabove.

This approach is fairly simplistic because it does not consider variations in apparent background motion due to perspective effects or complex sensor motion. While this approach works well for this example, it is not preferred as a general technique for moving target detection in the presence of sensor motion or significant drift. It is used here only to illustrate the efficacy of the temporal image integration technique.

Figure 10A:
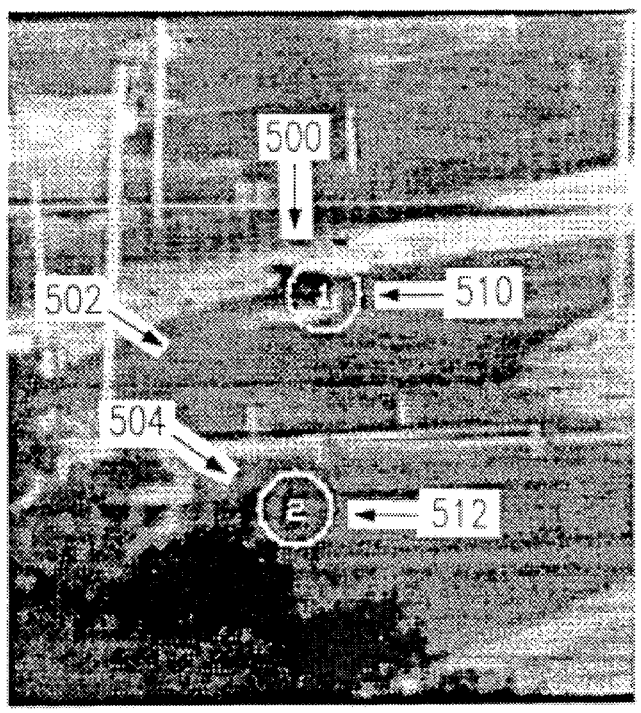
FIG. 10a shows boundaries around predicted targets in response to the optical flow vectors of FIG. 8b.
Figure 10B:
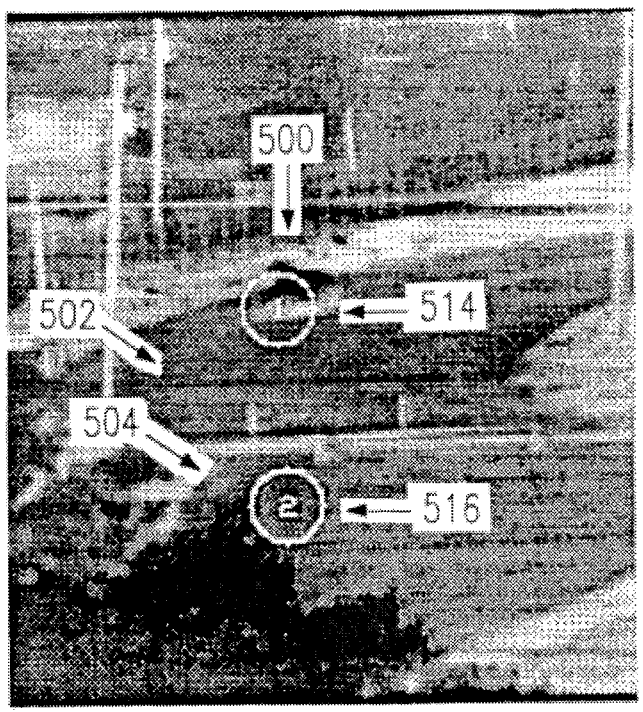
FIG. 10b shows boundaries around predicted targets in response to the optical flow vectors of FIG. 9b.

FIG. 10a shows circular boundaries 510 and 512 around predicted targets in response to the optical flow vectors of FIG. 8b. FIG. 10b shows circular boundaries 514 and 516 around predicted targets in response to the optical flow vectors of FIG. 10b. While car 500 and person 504 are properly predicted as the top two targets in both FIGS. 10a and 10b, the advantageous effect of temporal image integration is readily apparent from the detection score values shown in Table 2, where the true centroid pixel coordinates of car 500 and person 504 are marked with an asterisk (*).

TABLE 2

Detection Results for Experiment 2

| Target Rank | Centroid - $P_1$ | Score - $P_1$ | Centroid - $P_2$ | Score - $P_2$ |
| --- | --- | --- | --- | --- |
| 1 | (98,111)* | 3.19 | (95,104)* | 4.05 |
| 2 | (172,101)* | 2.51 | (172,98)* | 1.41 |
| 3 | (198,180) | 2.18 | (227,14) | 1.19 |
| 4 | (209,69) | 1.53 | (14,14) | 1.14 |
| 5 | (223,18) | 1.35 | (227,207) | 1.14 |
| 6 | (198,123) | 1.34 | (14,207) | 1.13 |
| 7 | (227,110) | 1.09 | (90,200) | 1.10 |
| 8 | (84,189) | 1.06 | (90,143) | 1.03 |
| 9 | (218,205) | 1.05 | (227,114) | 1.00 |
| 10 | (128,205) | 1.00 | (186,207) | 1.00 |

The detection score value for car 500 identified by circular boundary 514 of FIG. 10b is 4.05 as shown in Table 2 under the headings for $P_2$. Comparatively, the detection score value for car 500 identified by circular boundary 510 of FIG. 10a is only 3.19 as shown in Table 2 under the headings for $P_1$. Thus, car 500 is predicted with more confidence in response to optical flow field $P_2$ according to the technique of the preferred embodiment. Although Table 2 lists centroid pixel coordinates for the top 10 predicted target regions having the highest detection score values, only the top two entries of the target list from Table 2 are displayed in FIGS. 10a and 10b.

In the preferred embodiment, the optical flow determinations of steps 216 and 314 of FIGS. 2 and 3, respectively, are based on a multiresolution optical flow field.

FIG. 11 is a flow chart of the multiresolution optical flow determination technique of the preferred embodiment, which is executed by processor 106 of FIG. 1. In step 608, a first multiresolution image for Image 1 ("Image 1 Pyramid") is created by a multiresolution image pyramid generation technique. In step 610, a second multiresolution image ("Image 2 Pyramid") is created by the same multiresolution image pyramid generation technique for Image 2. A multiresolution image pyramid is created from an original image having a size of n×m pixels, so that images having progressively smaller numbers of pixels are formed to create progressively smaller resolution levels of the image pyramid. Any of several pyramid generation techniques may be used in steps 608 and 610 to create the multiresolution Image 1 Pyramid and the multiresolution Image 2 Pyramid.

Figure 12:
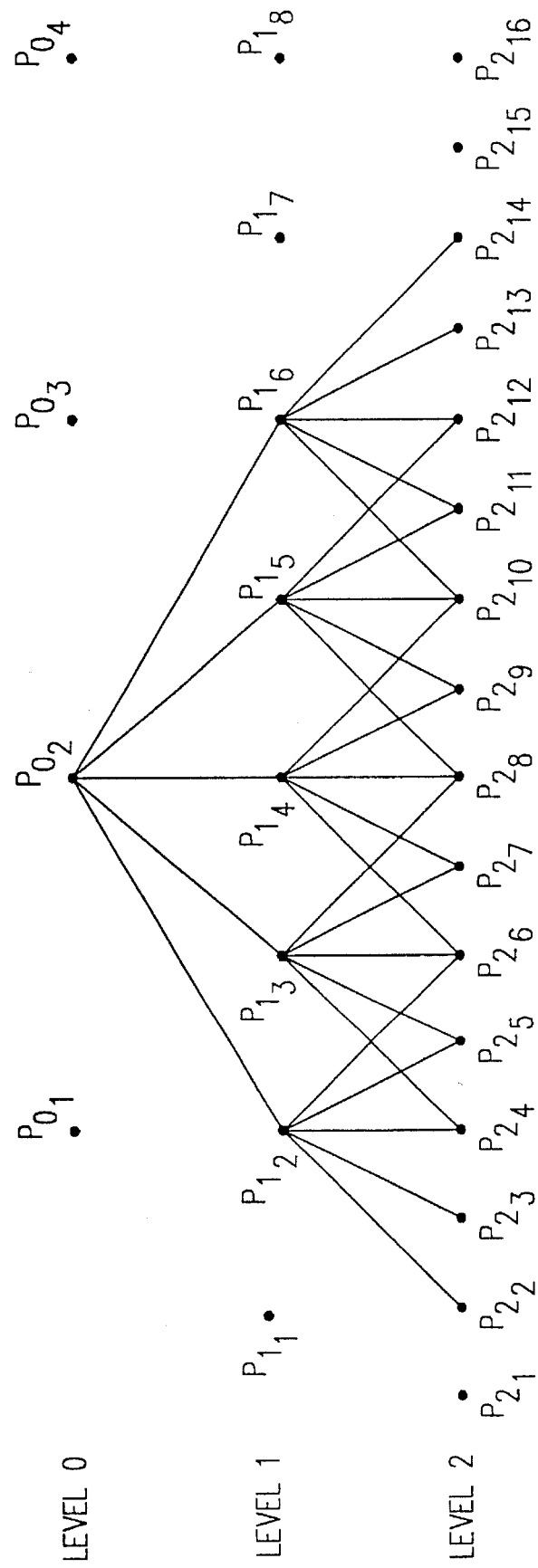
FIG. 12 is a conceptual illustration of one technique for generating pyramid levels, according to the multiresolution optical flow determination technique of the preferred embodiment.

FIG. 12 is a conceptual illustration of one technique for generating pyramid levels according to the preferred embodiment. In particular, FIG. 12 illustrates three pyramid levels (Level 0, Level 1, and Level 2) each having a single dimension of pixels $P_{a_b}$, where a is the pyramid level, and where b is the pixel's number on the specified pyramid level. The three pyramid levels together form a single image pyramid. In the preferred embodiment, a variable reduction factor is used to create the different levels of the image pyramid. For clarity, a reduction factor of 2 is used in the following discussion. Thus, if the original image has a size of n×m pixels, successive lower resolution levels of the pyramid will have sizes of $$\frac{n}{2} \times \frac{m}{2}, \frac{n}{4} \times \frac{m}{4}, \ldots \text{pixels}.$$

In the conceptual illustration of single dimension pyramid levels in FIG. 12, Level 2 has sixteen pixels $P_{2_1}$ through $P_{2_{16}}$, Level 1 has eight pixels $P_{1_1}$ through $P_{1_8}$, and level 0 has four pixels $P_{0_1}$ through $P_{0_4}$.

In the preferred embodiment, pyramid generation starts at the pyramid's highest resolution level (designated as level p), which contains the most number of pixels. Each pixel value in the next pyramid level (designated as level p−1) having a smaller number of pixels is computed as a weighted average of pixel values in level p within a 5-by-5 window as shown in FIG. 12. For example a value of pixel $P_{1_4}$ from Level 1 is computed as a weighted average of values of pixels $P_{2_6}$ through $P_{2_{10}}$ from Level 2 in FIG. 12. Each value in level p−2 is then computed from values in level p−1 by applying the same weighted averaging approach. Thus a value of pixel $P_{0_2}$ from Level 0 is computed as a weighted average of values of pixels $P_{1_2}$ through $P_{1_6}$ from Level 2 in FIG. 12.

A 5-by-5 weighting function is used because it provides adequate filtering at low computational cost; however, other weighting functions can be used. The weighting function is selected to approximate Gaussian filtering. Other filtering approximations can be obtained by changing the weighting function. The filtering operation is represented as:

$$E_{k-1}(i,j) = \sum_{m=-2}^{2} \sum_{n=-2}^{2} w(m,n) E_k(2i+m, 2j+n) \tag{48}$$

where $E_k(i,j)$ is the image intensity at pixel location (i,j) in level k of the pyramid, and w(m,n) is the weighting function.

Returning to FIG. 11, step 612 initializes a multiresolution optical flow field by determining a single level optical flow between the lowest resolution level, Level 0, of the Image 1 Pyramid and the lowest resolution level, Level 0, of the Image 2 Pyramid. Any of several optical flow determination techniques may be used to determine optical flow at a specified pyramid level, with each pixel of the pyramid level having an optical flow vector. For example, the optical flow determination can be based upon brightness, gradient constancy assumptions, and correlation or Fourier transform techniques.

The initialized multiresolution optical flow field determined at step 612 includes the optical flow vector (u,v) for each pixel at Level 0 of the Image 1 pyramid. The optical flow vector (u,v) for a pixel at Level 0 of the Image 1 pyramid indicates the pixel's direction of movement relative to Level 0 of the Image 2 pyramid, during the Δt time period between Image 1 and Image 2.

After initializing the multiresolution optical flow field at step 612, step 614 increments to the next higher resolution pyramid level, Level 1. At step 616, the initialized multiresolution optical flow field is expanded to twice its size by multiplying each component of the initialized multiresolution optical flow field by 2, resulting in an expanded initialized multiresolution optical flow field at Level 1 designated as $O_0^1$, such that $O_a^1$ is the multiresolution optical flow field from pyramid Level a.

The expansion process moves from a lower resolution pyramid level to a higher resolution pyramid level, opposite from the pyramid generation process which moves from a higher resolution pyramid level to a lower resolution pyramid level. For clarity, an expansion factor of 2 is used in the following discussion. Multiplication of components by a factor of 2 is necessary to account for a pyramid level's increased pixel resolution relative to the immediately preceding smaller pyramid level. Thus, expansion from level k−1 to level k of the pyramid is achieved by:

$$E_k(i,j) = 4 \sum_{m=-2}^{2} \sum_{n=-2}^{2} w(m,n) E_{k-1}\left(\frac{i-m}{2}, \frac{j-n}{2}\right) \quad (49)$$

where $E_k(i,j)$ is the image intensity at pixel location (i,j) in level k of the pyramid, and w(m,n) is the weighting function. The weighting function used for expansion is identical to the weighting function used for pyramid generation. Only terms for which $$\frac{i-m}{2} \text{ and } \frac{j-n}{2}$$

are integers are used.

At step 618, $O_0^1$ is used to register Level 1 of the Image 2 pyramid relative to Level 1 of the Image 1 pyramid. Registration is performed on a pixel-by-pixel basis. Given successive images $I_1$ and $I_2$ and the optical flow field O between them, the purpose of image registration is to register $I_1$ relative to $I_1$ on a pixel-by-pixel basis using the optical flow field vector components of O. This is achieved by creating a new image $\tilde{I}_2$, according to $$\tilde{I}_2(x,y) = I_2(x+u\Delta t, y+v\Delta t) \quad (50)$$

where (u,v) represents the optical flow vector at location (x,y), and where $\Delta t$ is the time interval between images $I_1$ and $I_2$. Since the vector components (u,v) are typically real numbers, the quantities $x+u\Delta t$, $y+v\Delta t$ may not correspond to integer pixel locations. In such cases, bilinear interpolation is used to compute the image intensity values.

At step 620, residual optical flow is computed between Level 1 of the Image 1 pyramid and the registered image $\tilde{I}_2$. This residual optical flow field is designated as $O_1^0$, such that $O_a^0$ is the residual optical flow field at pyramid level a.

At step 622, the multiresolution optical flow field is updated by summing $O_0^1$ and $O_1^0$ to form $O_1^1$, a comprehensive multiresolution optical flow field at Level 1 of the Image 1 pyramid. Step 624 then determines whether more pyramid levels remain to be processed. If step 624 determines that more pyramid levels remain to be processed, then the optical flow determination process continues to the pyramid's next level having a higher level of resolution at step 614. The above steps 616–624 are then repeated.

This process continues from the pyramid's lowest resolution level through to the pyramid's highest resolution level, which has a resolution level equal to that of the original image. At the pyramid's highest resolution level, the multiresolution optical flow field accounts for incremental contributions by each of the pyramid's preceding levels. After processing all pyramid levels, the multiresolution optical flow field at the pyramid's highest resolution level is further processed at step 626 by a segmentation technique.

The optical flow computation technique of the preferred embodiment is based on the gradient constancy assumption represented by $$E_{xx} u + E_{xy} v + E_{xt} = 0 \quad (51)$$

$$E_{xy} u + E_{yy} v + E_{yt} = 0 \quad (52)$$

where $E_{xx}, \ldots, E_{yt}$ represent second order spatio-temporal derivatives of the image intensity function E(x,y,t), and (u,v) is the optical flow vector. These equations can be solved for (u,v) at pixels where $E_{xx}E_{yy} - E_{xy}^2 \neq 0$.

Computer vision algorithms typically estimate derivatives from image data by finite differencing schemes, the data being first regularized (usually by convolution with a smoothing function such as a Gaussian). In the preferred embodiment, the smoothing and differentiation stages are combined by convolving the image data with spatio-temporal derivatives of the Gaussian according to $$E_{ij} = E(x,y,t) * G_{ij}(x,y) \quad (53)$$

where $$G(x,y) = A e^{-\frac{x^2+y^2}{2\sigma^2}} \quad (54)$$

is a spatial Gaussian with normalization A and i=x or y, j=x or y. The derivatives $E_{xt}$ and $E_{yt}$ are computed by convolving the image data with the first order Gaussian derivative $G_x$ or $G_y$ followed by frame differencing to compute the temporal part of the derivative. The filter kernels used are $$G_{xx}(x,y) = -\frac{1}{\sigma^2}\left[1 - \frac{x^2}{\sigma^2}\right] G(x,y) \quad (55)$$

$$G_{yy}(x,y) = -\frac{1}{\sigma^2}\left[1 - \frac{y^2}{\sigma^2}\right] G(x,y) \quad (56)$$

$$G_{xy}(x,y) = \frac{xy}{\sigma^4} G(x,y) \quad (57)$$

$$G_x(x,y) = -\frac{x}{\sigma^2} G(x,y) \quad (58)$$

$$G_y(x,y) = -\frac{y}{\sigma^2} G(x,y) \quad (59)$$

Although the examples of Table 1 and Table 2 are related to moving target indication applications, the noise reduction technique of the preferred embodiment can in general be used in other optical flow applications such as sensor motion estimation, and terrain structure estimation. Also, the specific technique for optical flow computation is only an example that illustrates the utility of temporal image integration. In general, the performance of any differential optical flow computation technique will be improved by temporal image integration. Thus, previous techniques may be improved in terms of robustness to noise by using temporally integrated imagery.

Importantly, the optical flow determination technique of the preferred embodiment is not limited to determining a target's movement. For example, the optical flow determination technique of the preferred embodiment can be applied to determine any significant change in the target's appearance. Moreover, the optical flow determination technique of the preferred embodiment is equally advantageous for other applications besides MTI. For example, data for a sequence of images can be encoded according to the optical flow technique of the preferred embodiment, thereby compressing the image data. By compressing the image data in this manner, image motion is accurately represented by a smaller amount of data. Advantageously, this smaller amount of data can be recorded in a smaller data storage area, and it can be communicated in a shorter time period at a higher frequency than otherwise possible.

Although the role of temporal image integration reduces noise effects, the analytic noise characterization developed for a differential optical flow computation technique is significant in itself because it describes the effects of interframe noise on optical flow fields and also provides bounds for the values of parameters used in temporal image integration. This represents an improvement over previous techniques which typically fail to provide analytic noise characterization of optical flow fields.

Although the present invention and its advantages have been described in detail, it should be understood that various changes, substitutions and alterations can be made herein without departing from the spirit and scope of the invention as defined by the appended claims.

What is claimed is:

1. A system for indicating a change between a first image and a second image of a target represented by electrical signals, comprising:

first means for sensing a sequence of images of the target including the first image, the second image and an additional image previous in said sequence to the first image and the second image, the first image being previous in said sequence to the second image, and for generating and transmitting said electrical signals representing said first image and said second image;

second means coupled to said first means for receiving said electrical signals transmitted by said first means;

third means coupled to said second means for digitizing said electrical signals;

fourth means responsive to said electrical signals and coupled to said third means for determining a first processed image in response to assigning a respective weight to each image previous in said sequence to the second image, determining a second processed image in response to said first processed image and the second image and determining an optical flow field in response to said first processed image and said second processed image, said optical flow field indicating the change between the first image and the second image;

fifth means coupled to said fourth means for indicating a change in the target in response to said optical flow field; and sixth means coupled to said fifth means and to said first means for controlling said first means in response to said indicated change in the target.

2. The system of claim 1 wherein said fourth means includes means for generating an initialized first processed image by initializing said first processed image to equal said first image.

3. The system of claim 2 wherein said fourth means includes means for generating said second processed image according to $$J_2 = (1-\lambda)E_2 + \lambda J_1$$

where $J_2$ is said second processed image, $E_2$ is the second image, $J_1$ is said initialized first processed image, and $\lambda$ is a weighting parameter.

4. The system of claim 1 wherein said fourth means includes means for generating said first processed image according to $$J_1 = (1-\lambda)E_1 + \lambda J_0$$

where $J_1$ is said first processed image, $E_1$ is the first image, $J_0$ is said additional image, and $\lambda$ is a weighting parameter.

5. The system of claim 1 wherein said fourth means includes means for generating said second processed image according to $$J_k = (1-\lambda)E_k + \lambda J_{k-1}$$

where $J_k$ is said second processed image, $E_k$ is the second image, $J_{k-1}$ is said first processed image, and $\lambda$ is a weighting parameter.

6. The system of claim 5 wherein $0<\lambda<1$.

7. The system of claim 6 wherein $0.2681<\lambda<1$.

8. The system of claim 7 wherein said change in the target is indicated by centroid coordinates.

9. The system of claim 8 wherein said change in the target is further indicated by a confidence measure.

10. The system of claim 7 wherein said change in the target comprises a movement of the target.

11. The system of claim 7 wherein said change in the target comprises a change in appearance of the target.

12. The system of claim 1 wherein said first means comprises a moving sensor.

13. A system for indicating a change between a first image and a second image of a target represented by electrical signals, comprising:

first means for sensing a first sequence of images of the target and a second sequence of images of the target, said first sequence including the first image, and said second sequence including the second image, and for generating and transmitting said electrical signals representing said first sequence of images and said second sequence of images;

second means coupled to said first means for receiving said electrical signals transmitted by said first means;

third means coupled to said second means for digitizing said electrical signals;

fourth means responsive to said electrical signals and coupled to said third means for determining a first processed image in response to assigning a respective weight to each image of said first sequence, determining a second processed image in response to said second sequence and determining an optical flow field in response to said first processed image and said second processed image, said optical flow field indicating the change between the first image and the second image;

fifth means coupled to said fourth means for indicating a change in the target in response to said optical flow field; and sixth means coupled to said fifth means and to said first means for controlling said first means in response to said indicated change in the target.

14. The system of claim 13 wherein said first sequence and said second sequence have at least one image in common.

15. The system of claim 13 wherein the first image is previous in said first sequence to the second image, and wherein said second sequence includes the second image and the first image.

16. The system of claim 15 wherein said first sequence includes the first image and at least one additional image previous in said first sequence to the first image.

17. The system of claim 13 wherein each said respective weight is assigned in response to an order of images in said first sequence, said order including a latest image of said first sequence and an earliest image of said first sequence.

18. The system of claim 17 wherein said respective weight progressively decreases from said latest image to said earliest image.

19. The system of claim 18 wherein said respective weight progressively decreases in an exponential manner from said latest image to said earliest image.

20. The system of claim 19 wherein said respective weight is assigned according to a weighting function $$M_1 = w_1 E_1 + \ldots + w_m E_m$$

where $$w_i = k_1 e^{-(i-1)/k_2}$$

where $M_1$ is said first processed image, $E_1$ is said latest image, $E_m$ is said earliest image, $k_1$ is a scale factor, $k_2$ is a decay rate factor, and i is an index.

21. A method of indicating a change between a first image and a second image represented by electrical signals, comprising the steps of:

sensing a sequence of images including the first image, the second image and an additional image previous in said sequence to the first image and the second image, the first image being previous in said sequence to the second image;

transmitting electrical signals representing said sequence of images to a receiver;

digitizing said electrical signals representing said sequence of images;

determining a first processed image in response to assigning a respective weight to each image previous in said sequence to the second image;

determining a second processed image in response to said first processed image and the second image;

determining an optical flow field in response to said first processed image and said second processed image, said optical flow field indicating the change between the first image and the second image;

compressing the first image and the second image by encoding the first image and the second image in response to said optical flow field; and controlling said sensing in response to the indicated change in a target.

22. The method of claim 21 wherein said step of processing said first processed image and the second image comprises the step of generating said second processed image according to $$J_k = (1-\lambda) E_k + \lambda J_{k-1}$$

where $J_k$ is said second processed image, $E_k$ is the second image, $J_{k-1}$ is said first processed image, and $\lambda$ is a weighting parameter.

23. The method of claim 21 wherein said step of determining an optical flow field in response to said first processed image and second processed image comprises the step of generating a multiresolution optical flow field.

24. The method of claim 21 wherein said step of determining an optical flow field in response to said first processed image and said second processed image comprises the step of generating said optical flow field according to brightness.

25. The method of claim 21 wherein said step of determining an optical flow field in response to said first processed image and said second processed image comprises the step of generating said optical flow field according to gradient constancy assumptions.

26. The method of claim 21 wherein said step of determining an optical flow field in response to said first processed image and said second processed image comprises the step of generating said optical flow field according to Fourier transform techniques.

27. A method of indicating a change between a first image and a second image represented by electrical signals, comprising the steps of:

sensing a first sequence of images including the first image;

sensing a second sequence of images including the second image;

transmitting electrical signals representing said first sequence of images and said second sequence of images to a receiver;

digitizing said electrical signals representing said first sequence of images and said second sequence of images;

determining a first processed image in response to assigning a respective weight to each image of said first sequence;

determining a second processed image in response to said second sequence;

determining an optical flow field in response to said first processed image and said second processed image, said optical flow field indicating the change between the first image and the second image; and indicating a change in a target in response to said optical flow field.

28. The method of claim 27 wherein each said respective weight is assigned in response to an order of images in said first sequence, said order including a latest image of said first sequence and an earliest image of said first sequence.

29. The method of claim 28 wherein said respective weight progressively decreases from said latest image to said earliest image.

30. The method of claim 29 wherein said respective weight progressively decreases in an exponential manner from said latest image to said earliest image.

31. The method of claim 30 wherein said respective weight is assigned according to a weighting function $$M_1 = w_1 E_1 + \ldots + w_m E_m$$

where $$w_i = k_1 e^{-(i-1)/k_2}$$

where $M_1$ is said first processed image, $E_1$ is said latest image, $E_m$ is said earliest image, $k_1$ is a scale factor, $k_2$ is a decay rate factor, and i is an index.

32. The method of claim 27 wherein said optical flow field comprises a plurality of pixel locations each having a value indicative of a magnitude and direction of movement of a corresponding pixel location of the first image relative to the second image.

33. The method of claim 32 wherein said indicating step comprises the step of processing said optical flow field by segmentation.

34. The method of claim 33 wherein said indicating step comprises the step of computing motion energy at a plurality of regions of said optical flow field.

35. The method of claim 33 wherein said step of processing said optical flow field comprises the step of performing histogram segmentation.

36. The method of claim 33 wherein said step of processing said optical flow field comprises the step of performing discontinuity edge detection.

* * * * *